United States Patent [19]
Holt

[11] 3,983,752
[45] Oct. 5, 1976

[54] REMOTE-READING OIL LEVEL GAUGE
[75] Inventor: Larry Allen Holt, Decatur, Ill.
[73] Assignee: Caterpillar Tractor Co., Peoria, Ill.
[22] Filed: June 12, 1975
[21] Appl. No.: 586,316

[52] U.S. Cl. ............................. 73/322; 116/118 R
[51] Int. Cl.² ......................................... G01F 23/08
[58] Field of Search ............ 73/322, 319; 116/118 R, 116/109

[56] References Cited
UNITED STATES PATENTS

| | | | |
|---|---|---|---|
| 1,173,117 | 2/1916 | Obermann | 73/322 |
| 1,515,524 | 11/1924 | Smith | 73/322 |
| 1,837,240 | 12/1931 | Thomas | 73/322 |
| 1,908,196 | 5/1933 | Talbot | 73/322 |
| 2,510,663 | 6/1950 | Schuessler | 73/322 |
| 3,358,835 | 12/1967 | Scheidt | 210/90 |
| 3,488,855 | 1/1970 | Howe | 33/126.7 |
| 3,540,276 | 11/1970 | Lyden | 73/328 |
| 3,572,120 | 3/1971 | Lukas | 73/292 |
| 3,572,122 | 3/1971 | Nusbaum | 73/314 |
| 3,835,708 | 9/1974 | Gruett | 73/292 |

FOREIGN PATENTS OR APPLICATIONS 527,902   3/1921   France .................. 73/322

Primary Examiner—S. Clement Swisher
Assistant Examiner—Denis E. Corr
Attorney, Agent, or Firm—Wegner, Stellman, McCord, Wiles & Wood

[57] ABSTRACT

An oil level gauge for vehicles, such as tractor-scrapers, which have an oil reservoir in a relatively inaccessible location. An upright tube of small diameter has an open lower end below the lowest level of oil in the reservoir, and an upper end which is in a location that is readily viewed by a person checking the oil level. A gauge rod in the tube has a float at its lower end and has a bright colored enlargement at its upper end which is visible through a sight glass in a fitting that surmounts and seals the top of the tube. The float and the enlargement serve to guide the rod.

9 Claims, 3 Drawing Figures

U.S. Patent Oct. 5, 1976 3,983,752
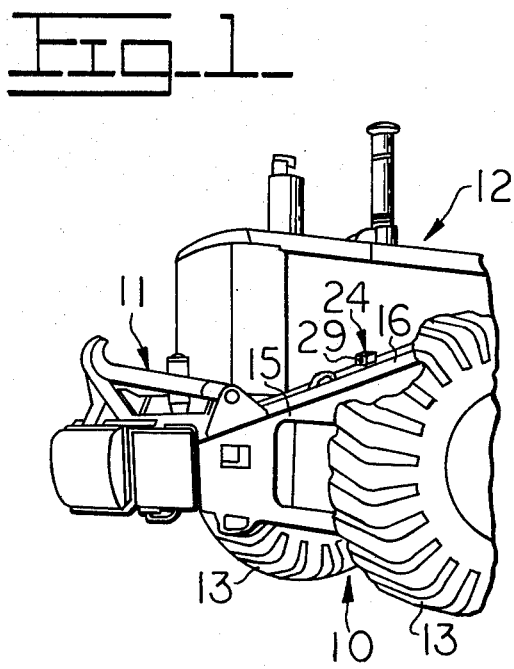
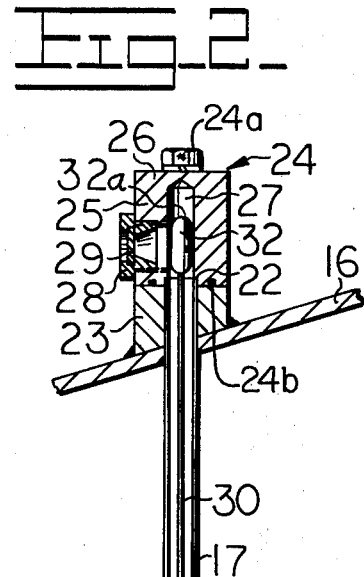
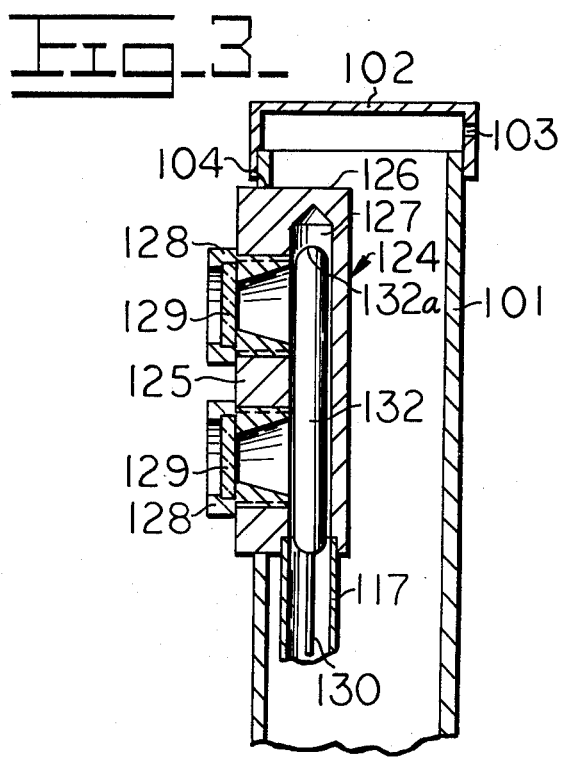

3,983,752

REMOTE-READING OIL LEVEL GAUGE

BACKGROUND OF THE INVENTION

Some heavy vehicles, of which tractor-scrapers are an example, have an oil reservoir in a location which is so inaccessible that an operator is likely to neglect checking the oil level as frequently as he should. The oil reservoir for the transmission-differential of a powered scraper of a tractor-scraper is particularly difficult from this point of view.

A typical vehicle oil reservoir is provided with a dip stick type of gauge which is carried in a tube and has its lower end in the reservoir. In order to determine the level of oil in the reservoir it is necessary to remove the dip stick, wipe it clean, reinsert it, and see where the oil level is on the stick. This is easy with most vehicles, but in certain types of vehicles the reservoir is so located that to check the oil level with the dip stick is quite difficult. Obviously, the oil reservoir for a vehicle crank case or transmission-differential must be somewhere in the bottom of the vehicle; and while it is simple enough to extend a filler pipe from the reservoir to a convenient location for adding oil, the top of a dip stick cannot always be as conveniently located because it must be in a pretty straight line from the lower portion of the reservoir.

SUMMARY OF THE INVENTION

The structure of the present invention combines a small guided float with a long rod that has a readily visible upper end portion aligned with a sight glass through which it may be readily observed by a person standing near the vehicle. The float and rod are carried in a small diameter upright tube which has an open lower end below the lowest permissible level of oil in the reservoir.

The principal object of the invention, therefore, is to provide an oil level gauge for a vehicle reservoir which permits the level of oil in the reservoir to be read from a remote location.

Another object of the invention is to provide such a gauge which is inexpensive, rugged, and devoid of any parts that can get out of order.

Although the invention is disclosed and described in conjunction with the transmission-differential oil reservoir of a tractor-scraper, it is apparent that it is equally applicable to any vehicle in which a substantially upright tube can extend from a point in the lower portion of the reservoir to a location where it may be readily viewed by a person checking the oil level. Most commonly, this will be a person who is standing alongside the vehicle; but in certain vehicle structures it could be possible for the gauge to be read by a person seated in the vehicle operator's seat.

Where the oil filler pipe extends straight up from the reservoir, the gauge may be mounted in the filler pipe with the sight glass in a hole in the side of the pipe.

THE DRAWINGS

FIG. 1 is a fragmentary perspective view of the rear portion of a tractor-scraper showing the location of the gauge sight glass on the vehicle;

FIG. 2 is a vertical central sectional view of an oil reservoir and a first embodiment of the gauge of the invention; and FIG. 3 is a fragmentary central sectional view on an enlarged scale, illustrating only the upper end portion of a second embodiment of the invention which illustrates mounting the gauge in an oil filler pipe.

DETAILED DESCRIPTION OF THE INVENTION

Referring to the drawings in detail, and referring first to FIG. 1, there is illustrated the rear end portion of a wheel-tractor-scraper of the type in which a scraper, indicated generally at 10, is pivotally attached to a gooseneck on a two-wheel tractor. The scraper 10 has a wheeled frame, indicated generally at 11, and an engine and transmission indicated generally at 12. In the lower portion of the frame 11, between a pair of wheels 13, is a transmission-differential oil reservoir 14 (FIG. 2). Between the engine-transmission 12 and each of the wheels 13 there is a side member 15 of a push frame structure, and the side member 15 has an upper web 16 which is directly above a portion of the reservoir 14 as seen in FIG. 2.

The gauge structure of the present invention includes a small diameter tube 17 which is fixedly mounted in a hole 18 in the top wall 19 of the reservoir 14. The tube 17 is welded into the top of the reservoir as indicated at 20, and has an open lower end 21 which is positioned below the minimum permissible level of oil in the reservoir. As illustrated in FIG. 2, an upper broken line F in the reservoir indicates "full" oil level and a lower broken line A indicates an "add" oil level. The tube 17 has an open upper end 22 which is received in a retainer sleeve 23 that surmounts the web 16 and is secured thereto. A breather hole 17a is bored through the tube wall within the reservoir 14 and above the highest level of oil in the reservoir.

A fitting, indicated generally at 24, which surmounts the sleeve 23, has a closed side wall 25 and top wall 26, and has a central bore 27 that is aligned with and forms an extension of the upper end of the tube. An opening in the front of the fitting 24 carries a frame 28 in which there is a sight glass 29. The fitting 24 is secured to the sleeve 23 by machine screws 24a; and a seal 24b is set in the bottom of the fitting to prevent leakage of fine dust into the tube 17.

Within the tube is a rod 30 which has a float 31 at its lower end and an enlarged upper end portion 32 which is of a color that makes it readily visible through the sight glass 29. As illustrated in FIG. 2, the enlarged upper end portion 32 of the rod 30 is visible through the sight glass 29 as long as the level of oil in the reservoir is between the line F and the line A. When the top 32a of the enlarged portion 32 is visible through the sight glass 29, it indicates that oil should be added to the reservoir 14.

In a typical structure, the tube 17 may be a .75 inch outside diameter steel tube, and the rod may be a 0.035 by 0.12 inch piece of spring steel. The float 31 and the enlarged upper end portion 32 may both be closed cell polyurethane foam molded to the spring steel rod or, alternatively, they may be small aluminum cylinders appropriately secured to the rod. In either case, the enlarged upper end portion 32 is finished in a non-oil soluble paint of a color which contrasts markedly with the color of the interior of the bore 27 and the fitting 24.

Referring now to FIG. 3, the second embodiment of the invention differs from the first in two respects. In the first place, it is mounted within an oil filler pipe 101 which extends through the top of an oil reservoir (not shown) and is provided with a removable closure 102 that has a skirt provided with a breather hole 103.

A small diameter gauge tube 117 is the same as the gauge tube 17 of the first embodiment, but is secured to the inner surface of the filler pipe 101 rather than being mounted by welding in a hole in the reservoir top wall.

A fitting, indicated generally at 124, surmounts the tube 117 and has a closed side wall 125 and top wall 126, the fitting being sealed in an opening 104 in the filler pipe 101. The fitting has a central bore 127 that is aligned with and forms an extension of the upper end of the tube 117, and a pair of spaced openings in the front of the fitting 124 carry identical frames 128 in which there are sight glasses 129.

Within the tube is a rod 130 which has a float like the float 31 at its lower end and which has an enlarged upper end portion 132 which is long enough to fill the space behind both of the sight glasses 129 and which is of a color which makes it readily visible through the sight glasses 129. When the top 132a of the enlarged upper end portion 132 is visible through the lower sight glass 129, it indicates that oil should be added to the reservoir.

The foregoing detailed description is given for clearness of understanding only and no unnecessary limitations should be understood therefrom, as modifications will be obvious to those skilled in the art.

I claim:

1. An oil level gauge for vehicles comprising, in combination:
   a small diameter upright tube which is sealed in a hole in the top of an oil reservoir, said tube having an open lower end below the lowest tolerable level of oil in the reservoir, and said tube having an open upper end portion projecting through an opening in a vehicle structural member in a location that is readily viewed by a person checking the oil level;
   a rod in said tube, said rod having a float at its lower end which guides the rod in the tube and floats the rod on the oil in the reservoir, and said rod having a readily visible upper end portion which is above the upper end of the tube;
   a retainer sleeve surmounting the vehicle structural member surrounding the opening therein and embracing the projecting upper end portion of the tube;
   a closure fitting which has a closed sidewall and top, said fitting surmounting the retainer sleeve and having a bore in which the readily visible upper end portion of the rod is received;
   bolts securing the closure fitting to the retainer sleeve;
   and a sight glass in said closed sidewall with which said upper end portion of the rod is aligned when oil in the reservoir is between a "full" level and an "add oil" level.

2. The combination of claim 1 which includes an enlargement on the upper end portion of the rod which is slightly smaller than the bore so as to center the rod in the tube, said enlargement being of a readily visible color.

3. An oil level gauge for vehicles comprising, in combination:
   a small diameter upright tube of uniform cross-section which is sealed in a hole in the top of an oil reservoir, said tube having an open lower end below the lowest tolerable level of oil in the reservoir, and said tube having an open upper end in a location that is readily viewed by a person checking the oil level;
   a closure fitting surmounting the tube, said fitting having a closed sidewall provided with a sight glass, and a closed top, and there being a bore in the lower portion of said fitting which is aligned with, and of the same diameter as the tube;
   and a rod in the tube which has a float at its lower end that is slightly smaller in diameter than the interior of the tube so that it centers the rod in the tube and floats the rod on the oil in the reservoir, and said rod having its upper end portion in the bore of the closure fitting;
   and an enlargement of a readily visible color on said upper end portion which is substantially the same diameter as the float so as to cooperate therewith to center the rod in the tube, said enlargement being visible through the sight glass when oil in the reservoir is between a "full" level and an "add oil" level.

4. The combination of claim 3 which includes a retainer sleeve mounted on a portion of the vehicle, the upper end portion of the tube is supported in said retainer sleeve, and the fitting surmounts the sleeve.

5. The combination of claim 3 in which the oil filler pipe extends through the top of the reservoir, and the tube is mounted in the filler pipe, there being an opening in the filler pipe through which said sight glass is visible.

6. The combination of claim 5 in which the closure fitting projects laterally through the opening in the filler pipe and is sealed in said opening.

7. The combination of claim 3 in which the closure fitting has two vertically spaced sight glasses, and the top of the enlargement is visible through the upper glass when the reservoir is full and is visible through the lower glass when oil should be added.

8. An oil level gauge for a vehicle which has an oil reservoir and an oil filler pipe extending through the top of the reservoir, the upper portion of said filler pipe being readily visible to a person standing adjacent the vehicle, said gauge comprising, in combination:
   a small diameter upright tube the upper end portion of which is in the filler pipe, said tube having an open lower end below the lowest tolerable level of oil in the reservoir and having an open upper end;
   a closure fitting which has a closed sidewall and top closing the upper end of the tube, said fitting having a bore in its lower portion which is aligned with the tube, one side of said sidewall extending laterally through an opening in the upper portion of the filler pipe, and being provided with a sight glass;
   and a rod in said tube, said rod having a float at its lower end which guides the rod in the tube and floats the rod on the oil in the reservoir, and said rod having a readily visible upper end which is aligned with the sight glass when oil in the reservoir is between a "full" level and an "add oil" level.

9. The combination of claim 8 in which the closure fitting has two vertically spaced sight glasses, and the top of the enlargement is visible through the upper glass when the reservoir is full and is visible through the lower glass when oil should be added.

* * * * *